I. BIRD.
VEHICLE WHEEL.
APPLICATION FILED APR. 12, 1913.

1,108,683.

Patented Aug. 25, 1914.
2 SHEETS—SHEET 1.

Witnesses

Inventor
Isaac Bird.
By Victor J. Evans
Attorney

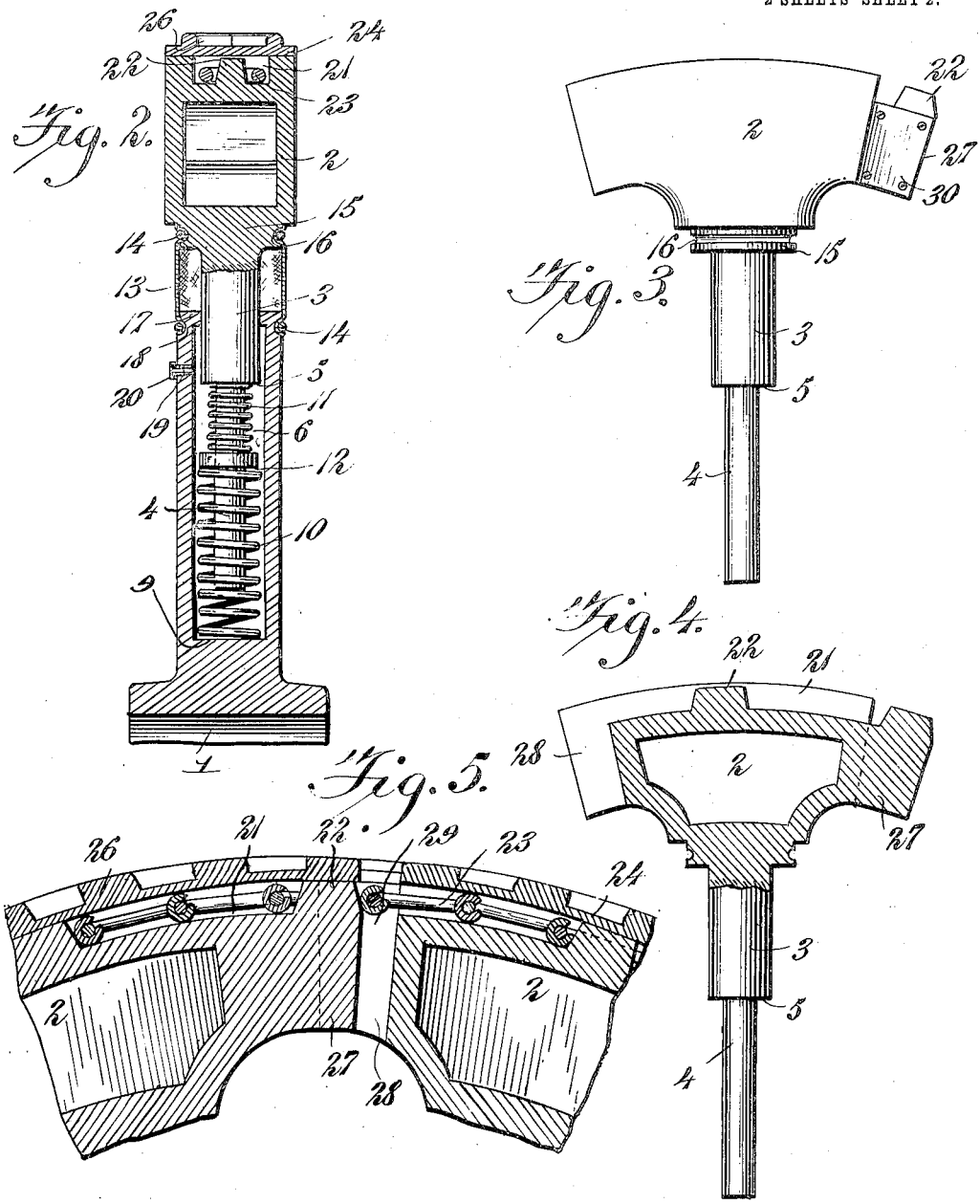

UNITED STATES PATENT OFFICE.

ISAAC BIRD, OF BARNESVILLE, MINNESOTA.

VEHICLE-WHEEL.

1,108,683.    Specification of Letters Patent.    Patented Aug. 25, 1914.

Application filed April 12, 1913. Serial No. 760,711.

*To all whom it may concern:*

Be it known that I, ISAAC BIRD, a citizen of the United States, residing at Barnesville, in the county of Clay and State of Minnesota, have invented new and useful Improvements in Vehicle-Wheels, of which the following is a specification.

This invention relates to vehicle wheels, the object in view being to provide a novel and practical form of spring wheel having all the resilient properties of the pneumatic tire now in common use on automobiles and the like, the wheel of this invention being specially designed for use on motor trucks, there being no liability whatever of puncture.

A further object of the invention is to provide a spring wheel in which the sections of the felly which are movable independently of each other, are sustained in position by sets of springs of differential tension so disposed with relation to each other that one set acts in supplemental relation to the other set to sustain the loads and impacts.

A further object of the invention is to provide novel means for flexibly connecting all of the felly sections so that while they are adapted to yield independently of each other they are also kept in perfect alinement with each other.

A further object of the invention is to provide means for effectively excluding dust, dirt and other foreign matter from the springs which support the felly sections thereby maintaining the working parts of the wheel in good condition at all times.

With the above and other objects in view the invention consists in the novel construction, combination and arrangement of parts herein described, illustrated and claimed.

Figure 1:
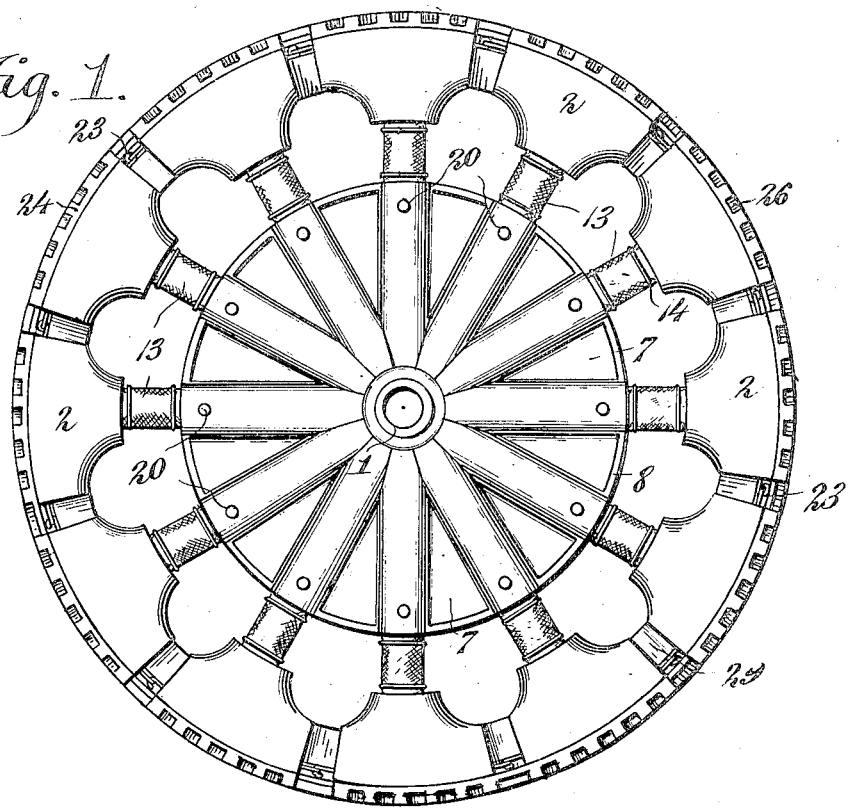
Figure 6:
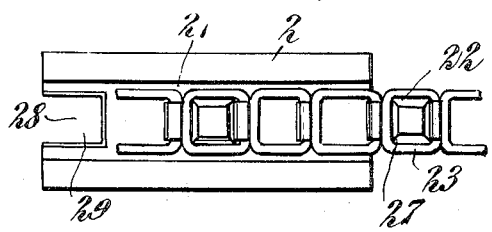
Figure 7:
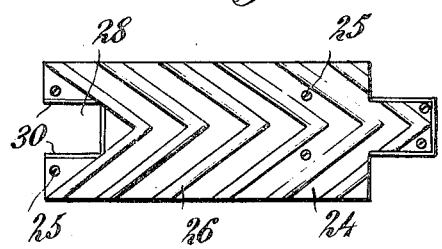

In the accompanying drawings, Figure 1 is a side elevation of a vehicle wheel embodying the present invention. Fig. 2 is a diametrical section through one-half of the wheel taken in line of one of the spokes. Fig. 3 is a side elevation of one spoke and felly section detached. Fig. 4 is a longitudinal section of the same. Fig. 5 is a longitudinal section through adjacent felly sections showing connecting chain. Fig. 6 is a face view of one of the felly sections with the traction plate removed. Fig. 7 is a similar view of the traction plate applied.

The wheel contemplated in this invention comprises a main body or hub section 1 and a felly which is composed of a circular series of felly sections 2 each of which is of hollow construction as clearly illustrated in the drawings so as to make same light without impairing the strength thereof. Each felly section 2 is mounted fast on the outer extremity of a spoke extending radially inwardly therefrom and in the preferred embodiment of this invention each spoke comprises an outer section 3 and an inner relatively small section 4, said sections being adapted to be made up of suitable lengths of tubes fitted and secured one within the other so as to form an annular shoulder 5, the purpose of which will appear.

The main body or hub 1 of the wheel is radially bored to form a series of spoke receiving sockets 6 which are connected by the intervening webs 7 and also by a rim 8 thereby adding greatly to the strength of the main body or hub of the wheel, the rim 8 being considerably wider than the thickness of the web so as to form laterally extending flanges. Within each spoke socket 6, a spring seat or shoulder 9 is formed against which bears the inward end of the comparatively heavy coiled cushion spring 10. A lighter spring 11 encircles the spoke beyond the heavier spring 10, and bears against the shoulder 5. The two springs 10 and 11 are held separate from each other by an interposed washer 12 which is mounted to slide freely upon the spoke. The springs 11, it will be noted, are lighter than the springs 10. The last named springs serve to support the load imposed on the wheel whereas the special function of the springs 11 is to take up slack in the chain which surrounds the felly sections at all points where no load or weight is imposed thereon. This keeps the chain taut and prevents the same from becoming displaced.

In order to protect the connection between each spoke and its socket, a flexible shield 13 of oiled canvas or some tough, waterproof material is placed around the spoke and wired or otherwise fastened to the spoke socket and felly section as shown at 14, the felly section being shown as provided with a cylindrical extension 15 having a groove 16 to receive the binding wire, while the socket is provided at its outer end with a corresponding annular shoulder or cylindrical extension 17 provided with groove 18 to receive binding wire which holds the flexible shield in place. This shield not only excludes dirt and foreign matter from the spoke socket, but also confines the lubricating oil which is introduced into each of the spoke sockets through an oil hole 19 provided with suitable closing cap 20.

Each of the felly sections is provided in its outer face with central longitudinal recesses 21 in which are sprocket teeth 22, engaging the corresponding links of the sprocket chain 23 which extends entirely around the periphery of the felly and thereby serves to lock the felly sections in relation to each other while at the same time permitting the felly sections to yield under the influence of the load imposed thereon, the said sprocket chain also serving to assist in keeping the felly sections in longitudinal alinement with each other.

24 designates a series of tread section plates one of which is secured to the outer face of each felly section 2 by means of screws 25 or their equivalent. Each of these tread plates is preferably provided upon its outer face with traction ribs 26, so as to prevent side skidding and giving the necessary traction properties to the tread of the wheel. The felly sections are also provided with a tongue and groove engagement at their adjacent ends, each felly section being provided at one end with a tongue or tenon 27 and at the opposite end with a groove or mortise 28 designed to receive the corresponding tongue or tenon of the adjacent felly section. The felly sections do not normally abut at their adjacent ends, spaces 29 being left so as to admit of the necessary inward and outward movement of the felly sections without interference one with another. The adjacent faces 29 of the felly sections are made inwardly divergent as shown so that in case gravel or stones should lodge between said faces, they will be automatically worked out of place by the operation of the felly sections due to the divergence of the opposing faces 29.

The peripheral faces of the felly sections are described on the arc of a circle of less radius than the arc of the complete wheel when it is not subjected to a load. This is done in order that, when a load is imposed on the wheel, the sections may yield inwardly to a point where the peripheral faces thereof will be described on an arc of which the axis of rotation of the wheel is the center. This imparts easy riding qualities to the wheel and avoids all jar and bumping which would occur in case such provision were not made.

Wear plates 30 of hard steel are secured to the working faces of the mortise and tenon so that when they become worn they may be readily replaced by new plates thus adding to the life and durability of the wheel as a whole.

From the foregoing description it will now be seen that each felly section is mounted on a spoke of its own and each felly section and spoke is adapted to yield radially inwardly independently of the remaining felly sections and spokes. Furthermore, the felly sections are held in perfect circumferential or longitudinal alinement with each other by reason of the mortise and tenon engagement and the contributory action of the sprocket chain which encircles all of the felly sections and holds the felly sections in place, serving to restrict or limit the outward movement thereof. It will also be seen that a normal load of the vehicle is carried by the lighter of the differential springs supplemented by the heavier springs and that when a heavier load is placed on the wheel the stronger springs serve to cushion the lighter springs and prevent their fracture. In this way the wheel automatically accommodates itself to the different loads imposed thereon.

I claim:—

1. A spring wheel embodying a circular series of independent radially movable felly sections having a tongue and groove engagement at their abutting ends and formed with longitudinal grooves in their outer faces, a spoke attached to each section and radially movable therewith, sprocket teeth on the outer peripheral faces of the felly sections and located within said grooves, an endless sprocket chain engaging said teeth and extending entirely around the periphery of the felly within the grooves of the sections, and tread plate sections secured to the felly sections and covering said chain and its containing groove.

2. A spring wheel embodying a circular series of independent radially movable felly sections having a tongue and groove engagement at their abutting ends and formed with longitudinal grooves in their outer faces, a spoke attached to each section and radially movable therewith, sprocket teeth on the outer peripheral faces of the felly sections and located within said grooves, an endless sprocket chain engaging said teeth and extending entirely around the periphery of the felly within the grooves of the sections, and tread plate sections secured to the felly sections and covering said chain and its containing groove, the curvature of the felly sections being of less radius than that of the circumference of the wheel as a whole when not subjected to a load and of such curvature as to be concentric to the axis of the wheel when the sections are at the inner limit of their movement.

In testimony whereof I affix my signature in presence of two witnesses.

ISAAC BIRD.

Witnesses:
W. S. LEE,
W. A. LINDQUIST.